Figure 1:
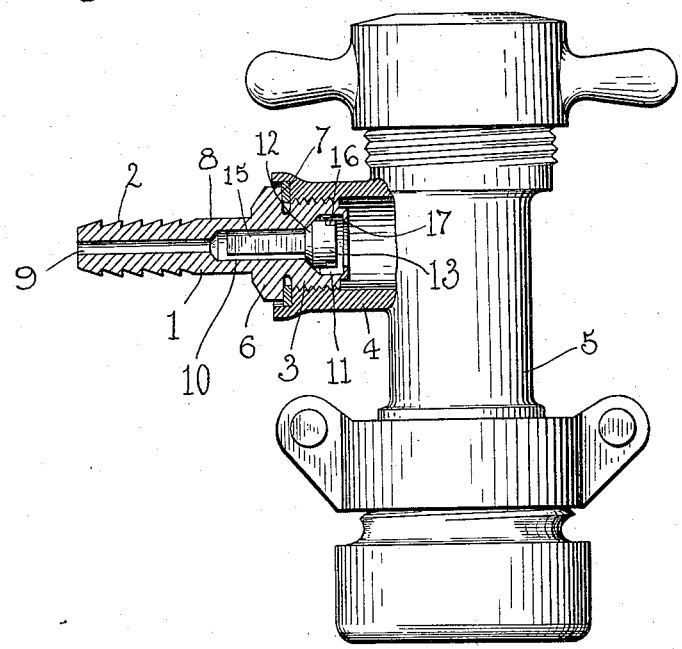

F. E. RICE.
CHECK VALVE.
APPLICATION FILED APR. 10, 1914.

1,164,869.

Patented Dec. 21, 1915.

Witnesses
Arthur F. Draper
Anna M. Dorr

Inventor
Frank E. Rice
By
Attorneys

UNITED STATES PATENT OFFICE.

FRANK E. RICE, OF DETROIT, MICHIGAN, ASSIGNOR TO AMERICAN TAP BUSH CO., OF DETROIT, MICHIGAN, A CORPORATION OF MICHIGAN.

CHECK-VALVE.

1,164,869.  Specification of Letters Patent.  Patented Dec. 21, 1915.

Application filed April 10, 1914. Serial No. 830,849.

*To all whom it may concern:*

Be it known that I, FRANK E. RICE, a citizen of the United States of America, residing at Detroit, in the county of Wayne and State of Michigan, have invented certain new and useful Improvements in Check-Valves, of which the following is a specification, reference being had therein to the accompanying drawings.

This invention relates to a check valve for beer tapping apparatus, and the objects of my invention are to provide a valve of the above type that can be easily detached from the apparatus and the valve seat thereof ground or foreign matter removed therefrom to insure perfect seating of the valvular member, and to provide a valve that can be advantageously used in connection with beer dispensing apparatus to insure cleanliness and a positive control of air or gas used in connection with the apparatus.

Other objects of my invention are to provide a valve of the above type that can have the valve seat thereof ground or cleansed without disassembling the parts of the valve, and to provide a simple, durable and inexpensive valve that cannot become accidentally displaced due to excessive gas pressure in a vessel or excessive pressure from an air pump.

Further objects of my invention are to provide a valve that cannot become fouled or choked by the liquid contents of a vessel, or injuriously affected by the liquid or gas therein, and to provide a check valve that can be advantageously used in connection with that type of tap and bushing disclosed by my application filed June 8th, 1912, Serial No. 702,456.

With the above and other objects in view, the invention resides in the novel construction and arrangement of parts to be hereinafter specifically described and then claimed, and reference will now be had to the drawing, wherein—

Figure 2:
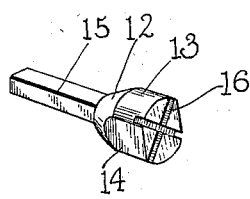

Figure 1 is a longitudinal sectional view of the check in connection with a tap and bushing, and Fig. 2 is a perspective view of a valvular member adapted to form part of the valve.

A valve in accordance with this invention comprises a body 1 having one end thereof circumferentially grooved or stepped to form annular ribs 2 that afford a positive grip for a tube or hose (not shown) by which the valve body may be connected to the usual air pump or compression air reservoir. The opposite end of the body 1 is enlarged and exteriorly screw threaded, as at 3, whereby it can be detachably mounted in the connection 4 of a tap and bushing 5. Adjacent to the threaded enlargement 3 is an annular flange or collar 6 and interposed between the collar 6 and the enlargement 3 is an annular gasket or washer 7 for engaging the end of the connection 4 to establish a non-leakable connection between the valve body and such connection. The valve body, contiguous to the annular flange or collar 6 has flat facets 8 to accommodate a wrench or other instrument employed to tighten the threaded enlargement 3 in the connection 4.

The valve body 1 has a longitudinal bore 9, which, for the greater part of its length is enlarged, as at 10, and the enlarged end of the bore terminates in a cage 11 having an annular valve seat 12.

Loosely mounted in the cage 11 of the valve body 1 is a valvular member 13 adapted to engage the seat 12 and close the inner end of the bore. The valvular member 13 is preferably cylindrical and has oppositely disposed sides thereof provided with flat facets 14 allowing air or gas to freely pass the valvular member when unseated. The member 13 has a rectangular stem 15 extending into the enlarged portion or end 10 of the bore 9 and said member has the opposite end thereof provided with intersecting grooves 16, which permit of a screw driver or other suitable instrument being placed in engagement with the valvular member to rotate the same upon the seat 12 and thereby grind the seat and remove foreign matter from the same that would otherwise prevent a perfect seating of the valvular member and thus impair the usefulness of the valve.

To retain the valvular member 13 within the cage 11, the enlarged end 3 of the valve body 1 has an annular stop flange 17 that is bent or turned in to coöperate with the valve body in forming the cage 11. This inturned flange prevents the valvular member from becoming accidentally displaced, due to excessive pressure and after the valvular member 13 has been once installed it is an extremely easy matter to maintain the same in operative condition. While the flange 17 prevents displacement of the valvular member 13, it does not interfere with the insertion of a screw driver or other instrument in one of the grooves 16 of the valve for rotating the same.

It is thought that the utility of the check valve will be apparent without further description, and while in the drawing there is illustrated a preferred embodiment of the invention, it is to be understood that the structural elements are susceptible to such variations and modifications as fall within the scope of the appended claim.

What I claim is:

The combination with a beer tap having a connection, of a valve mounted in said tap connection and comprising a valve body having a longitudinal bore formed therein with one end of said bore enlarged and provided with a valve seat, a valvular member in the enlarged head of the said valve body, and adapted to seat therein and having flat facets spaced from the walls of the bore, a stem carried by said valvular member and extending into the bore of said valve body, said valve body having the end thereof reduced to provide an annular inturned relative thin stop flange coöperating with the walls of the enlarged end of the bore of said body in retaining said valvular member within the enlarged end of said valve body, and said stop flange providing an opening exposing the end of said valvular member to facilitate rotating the same in said valve body.

In testimony whereof I affix my signature in presence of two witnesses.

FRANK E. RICE.

Witnesses:
 ANNA M. DORR,
 G. E. McGRANN.

Copies of this patent may be obtained for five cents each, by addressing the "Commissioner of Patents, Washington, D. C."